Sept. 17, 1957 W. E. FINKEN 2,806,557
WINDSHIELD WIPER TRANSMISSION ASSEMBLY AND
WEATHER SHIELD THEREFOR
Filed June 23, 1955
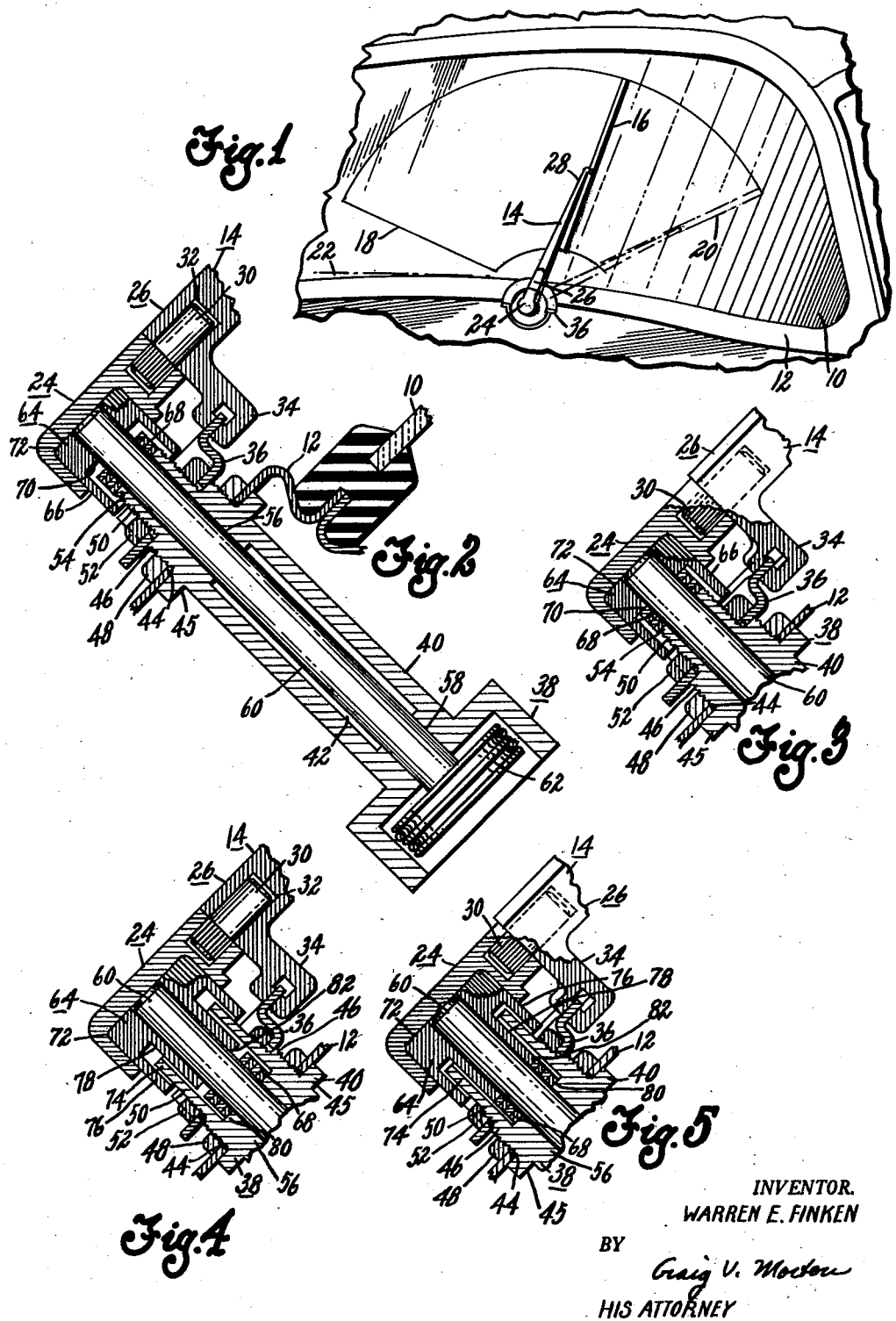
INVENTOR.
WARREN E. FINKEN
BY
Craig V. Morton
HIS ATTORNEY

વ2,806,557

Patented Sept. 17, 1957

1

2,806,557

WINDSHIELD WIPER TRANSMISSION ASSEMBLY AND WEATHER SHIELD THEREFOR

Warren E. Finken, Dayton, Ohio, assignor to General Motors Corporation, Detroit, Mich., a corporation of Delaware Application June 23, 1955, Serial No. 517,607

6 Claims. (Cl. 188—85)

This invention pertains to windshield wipers, and particularly to an improved transmission assembly for vehicle windshield wipers.

In copending application Serial No. 517,605, filed of even date herewith in the name of Charles P. Roth and assigned to the assignee of this invention, a windshield wiper transmission assembly embodying automatically operable, cushioning brake means for eliminating undesirable wiper arm "slap" at the outboard stroke end, is disclosed. The present invention relates to an improved transmission assembly of the type disclosed in the aforementioned application, and is particularly directed to means for shielding the cushioning brake from exposure to the elements. Accordingly, among my objects are the provision of a wiper transmission assembly including means for shielding relatively movable parts thereof from exposure to the elements; the further provision of a wiper transmission assembly including cushioning brake means disposed within an annular skirt integral with the drive burr of the transmission; and the still further provision of a wiper transmission assembly including cushioning brake means disposed within the transmission housing and cooperable with the drive burr thereof.

The aforementioned and other objects are accomplished in the present invention by disposing the disc brake assembly within telescoping sleeve portions of the transmission assembly. Two embodiments of the improved brake assembly are disclosed herein. In the first embodiment, the drive burr of the transmission assembly is formed with an inwardly extending weather skirt that telescopically receives the outer end of the stationary transmission housing. The brake discs are disposed within a skirt of the drive burr about the transmission shaft, and the inner disc engages the end of the transmission housing. The outer disc is engaged by the inner end wall of the drive burr during axial inward movement of the transmission shaft adjacent the outboard stroke end position of the wiper.

In the second embodiment, the transmission shaft housing is formed with an outwardly extending annular skirt spaced radially from the transmission shaft. The brake discs are disposed within the housing skirt, the inner disc engaging an internal shoulder of the housing. In this embodiment, the drive burr is formed with a pair of radially spaced sleeve portions, and the housing sleeve is telescopically received therebetween. The inner skirt, or sleeve, of the drive burr is arranged to engage the outer brake disc during axially inward movement of the transmission shaft. In both embodiments, the disc brake assembly is effectively shielded from the weather since the transmission assembly is inclined upwardly through the vehicle cowl. In this manner, the disc brake assembly is protected from rain, snow, ice, and other foreign matter, which could otherwise impair the proper operation of the cushioning brake assembly.

Further objects and advantages of the present invention will be apparent from the following description reference being had to the accompanying drawing wherein preferred embodiments of the present invention are clearly shown.

In the drawing:

Fig. 1 is a fragmentary view, in elevation, of a vehicle equipped with the improved wiper transmission assembly of this invention.

Fig. 2 is an enlarged fragmentary sectional view of the first embodiments of the improved transmission assembly with the brake means released.

Fig. 3 is a fragmentary sectional view of the first embodiment with the brake means engaged.

Fig. 4 is a fragmentary sectional view of the second embodiment of the improved transmission assembly with the brake means released.

Fig. 5 is a fragmentary sectional view of the second embodiment with the brake means engaged.

With particular reference to Fig. 1, a vehicle is shown having a wrap-around windshield 10 and a cowl 12. The vehicle includes windshield cleaning apparatus of a conventional type comprising a wiper motor, not shown, and a pair of spaced oscillatable wipers which operate asymmetrically. Only one wiper is disclosed in Fig. 1, and this wiper comprises an arm 14, which detachably carries a blade 16. The arm 14 is drivingly connected to a shaft, hereinafter described, and the shaft is drivingly connected with the motor so that during operation, the blade 16 is oscillated between an inboard stroke end indicated by line 18, and an outboard stroke end indicated by line 20. The wiper blade may also be moved to a parked position adjacent the cowl, as indicated by line 22, when operation is discontinued.

The wiper arm 14, as disclosed in Figs. 1 and 2, comprises a mounting section 24, a rockable intermediate section 26 and a blade carrying section 28. The rockable section 26 is connected to the mounting section 24 by means of a pin 30, the inner end of which is rigidly connected to the mounting section 24, and the outer end of which is disposed within a cylindrical recess 32 of the outer section 26. Thus, the intermediate section 26 and the blade carrying section 28, which is pivotally connected thereto are free to pivot relative to the mounting section 24 about the longitudinal arm axis. In order to achieve this result, the rockable section 26 is formed with a cam follower 34, which engages the opposed surfaces of a double-acting stationary cam 36, this mechanism being of the type disclosed in the Oishei, et al. Patent No. 2,691,186.

The invention disclosed herein pertains to the weather proofing of the cushioning brake assembly disclosed in the aforementioned copending application. The brake assembly constitutes a part of the transmission assembly generally depicted by the numeral 38, in Figs. 2 and 3, which comprises a stationary housing 40 having an axial through bore 42. The housing extends through an aperture 44 in the cowl 12 and is formed with a shoulder 45 arranged to abut the inner surface of the cowl 12. The housing 40 includes a threaded portion 46 arranged to receive an escutcheon nut 48 for rigidly connecting the housing 40 to the vehicle. The housing 40 also includes a second, smaller diameter threaded portion 50, which receives a nut 52 for attaching the fixed cam 36 thereto. The housing 40 terminates outwardly of the cam 36 and presents a shoulder 54.

The through bore 42 of the housing is formed with internal bearing surfaces 56 and 58 within which a transmission shaft 60 is rotatably journaled. A pulley assembly 62 is drivingly connected to the inner end of the shaft 60. A drive burr 64, having longitudinal serrations, is rigidly connected to the outer end of the transmission shaft 60. In this instance, the burr 64 is formed with an inwardly extending skirt, or sleeve, 66 having a telescopic relation with the threaded portion 50 of the housing 40.

The cushioning brake means, comprising one or more friction discs 68, are mounted on the shaft 60 between the inner end 70 of the drive burr 64 and the end 54 of the housing. By reason of the overlapping relation of the skirt 66 and the portion 50, and the upward inclination of the transmission assembly 38, rain, snow, sleet, or other foreign matter will be deflected away from the brake discs 68 and thereby will not impair the operation of the cleaning mechanism.

The mounting section 24 is formed with a complementary serrated recess 72, and receives the drive burr 64 so as to establish a driving connection between the shaft 60 and the wiper arm 14. By reason of the curvature of the stationary cam 36, as disclosed more particularly in the aforementioned copending application, during the latter portion of the outboard stroke of the wiper arm and blade, the shaft 60 will move axially inward from the position depicted in Fig. 2 to the position in Fig. 3, where the inner end 70 of the drive burr 64 will engage the outer brake disc and compress these discs against the outer end 54 of the housing 40 so as to decelerate angular movement of the shaft 60 and the cleaner attached thereto. Conversely, during the first portion of the inboard stroke, the shaft 60 moves axially outward to gradually release the brake means and permit acceleration of the shaft 60 and the cleaner attached thereto.

With particular reference to Figs. 4 and 5, the second embodiment of the improved wiper transmission assembly is disclosed wherein foreign matter is prevented from impairing the operation of the cushioning brake means, similar reference characters denoting similar parts throughout the several views. In the second embodiment, the housing 40 is formed with an elongated sleeve portion 74 having exterior threads at 50. The cam 36 is retained in fixed position by means of a nut 52 and the housing 40 is secured to the cowl 12 by the escutcheon nut 48, which engages a threaded portion 46. The transmission shaft 60 is permanently connected to the drive burr 64, which has a longitudinally serrated exterior disposed within the complementary socket 72 of the arm mounting section 24. In this embodiment, the burr 64 is formed with a pair of radially spaced, coaxial sleeve, or skirt, portions 76 and 78, and the housing sleeve 74 is telescopically received therebetween. The brake discs 68 are disposed within the sleeve 74, the inner disc engaging the end surface 80 of the bearing shoulder 56. The inner end 82 of the burr sleeve 78 is arranged to engage the outer brake disc 68 upon inward axial movement of the shaft 60, as depicted in Fig. 5. By reason of the telescopic arrangement of the housing and burr sleeves, it will be appreciated that all foreign matter will be excluded from the cushioning brake assembly which operates in a manner identical to that described in conjunction with the first embodiment.

From the foregoing, it is apparent that the present invention provides a wiper transmission assembly wherein the cushioning brake means are protected from exposure to the elements and other foreign matter which might impair proper operation of the cleaning mechanism.

While the embodiments of the present invention as herein disclosed, constitute preferred forms, it is to be understood that other forms might be adopted.

What is claimed is as follows:

1. A wiper shaft transmission assembly including, a stationary housing, a wiper shaft rotatably journaled in said housing and capable of axial movement relative thereto, means for effecting axial movement of said shaft during angular movement thereof, disc brake means operatively connected with said shaft for decelerating angular movement of said shaft during axial movement thereof, and means enclosing said brake means to exclude the entrance of foreign matter thereinto.

2. A wiper shaft transmission assembly including, a stationary housing, a wiper shaft rotatably journaled in said housing and capable of axial movement relative thereto, means for effecting axial movement of said shaft during angular movement thereof, brake means operatively connected with said shaft for decelerating angular movement of said shaft during axial movement thereof, a member rigidly connected to said shaft, said brake means being disposed between said stationary housing and said member so as to be engaged by said member during axial movement of said shaft, and means enclosing said brake means to exclude foreign matter therefrom.

3. A wiper shaft transmission assembly including, a stationary housing, a wiper shaft rotatably journaled in said housing and capable of inward and outward axial movement relative thereto, means for effecting inward axial movement of said shaft during oscillation thereof, friction brake means operatively connected with said shaft for decelerating oscillation thereof, and means for actuating said brake means during inward axial movement of said shaft, said means including a member rigidly connected to said shaft and having a weather skirt extending in overlapping relation with said housing, said friction brake means being disposed between said housing and said member so as to be engaged by said member during inward axial movement of said shaft.

4. A wiper shaft transmission assembly including, a stationary housing having an extending portion, a wiper shaft rotatably journaled in said housing and capable of axial movement relative thereto, means for effecting axial movement of said shaft during oscillation thereof, disc brake means operatively connected with said shaft for decelerating oscillation thereof, and means for actuating said disc brake means during axial movement of said shaft comprising a member rigidly connected to said shaft and having a weather skirt extending in overlapping relation with the extended portion of said housing, said disc brake means being disposed between the extended portion of said housing and said member so as to be engaged by said member during axial movement of said shaft.

5. A wiper transmission assembly including, a stationary housing having an extended portion presenting a shoulder, a wiper shaft rotatably journaled in said housing and capable of axial movement relative thereto, means for effecting axial movement of said shaft during oscillation thereof, disc brake means operatively connected with said shaft for decelerating oscillation thereof, and a member rigidly connected to said shaft and having a weather skirt extending in overlapping relation with the extended portion of said housing, said disc brake means being disposed between said shoulder and the inner end surface of said member within said weather skirt and engageable with said inner end surface during axial movement of said shaft.

6. A wiper shaft transmission assembly including, a stationary housing, a wiper shaft rotatably journaled in said housing and capable of axial movement relative thereto, said housing having a sleeve extension radially spaced from a portion of said shaft, means for effecting axial movement of said shaft during oscillation thereof, disc brake means operatively connected with said shaft for decelerating oscillation thereof, and a member rigidly connected to said shaft and having a pair of radially spaced sleeve portions extending in telescopic relation with said sleeve extension, said disc brake means being disposed within said sleeve extension and engageable with the inner sleeve portion of said member during axial movement of said shaft.

References Cited in the file of this patent

UNITED STATES PATENTS

| | | |
|---|---|---|
| 1,982,624 | Barker | Dec. 4, 1934 |
| 2,336,007 | Fuller | Dec. 7, 1943 |